US012746695B2

(12) United States Patent
Hirata et al.

(10) Patent No.: US 12,746,695 B2
(45) Date of Patent: Sep. 29, 2026

(54) BENDING STRUCTURE AND METHOD FOR PRODUCING SAME

(71) Applicant: NHK SPRING CO., LTD., Kanagawa (JP)

(72) Inventors: Takafumi Hirata, Kanagawa (JP); Yuki Hotoda, Kanagawa (JP); Yuki Hayakawa, Kanagawa (JP)

(73) Assignee: NHK SPRING CO., LTD., Kangawa (JP)

( * ) Notice: Subject to any disclaimer, the term of this patent is extended or adjusted under 35 U.S.C. 154(b) by 469 days.

(21) Appl. No.: 18/285,861

(22) PCT Filed: Apr. 28, 2022

(86) PCT No.: PCT/JP2022/019275
§ 371 (c)(1),
(2) Date: Oct. 6, 2023

(87) PCT Pub. No.: WO2022/230976
PCT Pub. Date: Nov. 3, 2022

(65) Prior Publication Data

US 2024/0181658 A1 Jun. 6, 2024

(30) Foreign Application Priority Data

Apr. 30, 2021 (JP) ................................ 2021-078149

(51) Int. Cl.
*B25J 17/00* (2006.01)
*B23K 26/21* (2014.01)

(52) U.S. Cl.
CPC ............... *B25J 17/00* (2013.01); *B23K 26/21* (2015.10)

(58) Field of Classification Search
CPC ................................ B25J 17/00; B23K 26/21
(Continued)

(56) References Cited

U.S. PATENT DOCUMENTS 4,901,987 A * 2/1990 Greenhill .................. F16F 1/06
267/182
9,570,968 B1 * 2/2017 Chen .................. B23K 15/0046
(Continued)

FOREIGN PATENT DOCUMENTS

JP H09108874 4/1997
JP H1065273 3/1998
(Continued)

OTHER PUBLICATIONS

"Search Report of Europe Counterpart Application", issued on Nov. 25, 2024, p. 1-p. 5.
(Continued)

*Primary Examiner* — David R Deal
(74) *Attorney, Agent, or Firm* — JCIPRNET

(57) ABSTRACT

A bending structure includes a bending part that is elastically bendable with respect to the axial direction, a movable part serving as an end member that is attached to an end of the bending part in the axial direction, a thin part that is formed at the movable part and is thinner than the movable part in the axial direction, a notch that is provided at the movable part and exposes the thin part in the axial direction in a manner capable of being irradiated with a laser light of laser welding, and a welding part that is formed at the thin part by laser welding and joins the thin part to the bending part.

8 Claims, 8 Drawing Sheets

(58) Field of Classification Search
USPC .......................................................... 138/142
See application file for complete search history.

(56) References Cited

U.S. PATENT DOCUMENTS

| | | | | |
|---|---|---|---|---|
| 10,624,530 | B2 * | 4/2020 | Graham | A01K 85/005 |
| 11,576,740 | B2 * | 2/2023 | Kurokawa | A61B 34/30 |
| 2004/0236316 | A1 * | 11/2004 | Danitz | A61B 34/70<br>606/1 |
| 2010/0160735 | A1 * | 6/2010 | Bakos | A61B 34/71<br>600/141 |
| 2011/0065516 | A1 | 3/2011 | Martin | |
| 2022/0145956 | A1 * | 5/2022 | Kawai | B25J 9/0015 |
| 2022/0193932 | A1 * | 6/2022 | Otsuka | F16F 1/025 |
| 2024/0253251 | A1 * | 8/2024 | Hirata | B25J 18/06 |

FOREIGN PATENT DOCUMENTS

| | | |
|---|---|---|
| JP | 2020172001 | 10/2020 |
| JP | 2020172002 | 10/2020 |
| WO | 2019073860 | 4/2019 |

OTHER PUBLICATIONS

"International Preliminary Report on Patentability (Form PCT/IB/373) of PCT/JP2022/019275," issued on Oct. 24, 2023, with English translation thereof, pp. 1-11.
"International Search Report (Form PCT/ISA/210) of PCT/JP2022/019275", mailed on Jul. 26, 2022, with English translation thereof, pp. 1-4.
"Office Action of Taiwan Counterpart Application", issued on Dec. 5, 2022, with English translation thereof, p. 1-p. 14.

* cited by examiner

BENDING STRUCTURE AND METHOD FOR PRODUCING SAME

CROSS-REFERENCE TO RELATED APPLICATION

This application is a 371 application of the International PCT application serial no. PCT/JP2022/019275, filed on Apr. 28, 2022, which claims the priority benefits of Japan Patent Application No. 2021-078149, filed on Apr. 30, 2021. The entirety of each of the above-mentioned patent applications is hereby incorporated by reference herein and made a part of this specification.

TECHNICAL FIELD

The present invention relates to a bending structure and a method for producing the same that are provided for a joint function part of a robot or a manipulator.

RELATED ART

As shown in Patent Document 1, a conventional bending structure has been disclosed to be obtained by attaching an end member to an end in an axial direction of a bending part that is elastically bendable.

The bending part is formed by laminating a plurality of wave washers and maintaining the laminated state by laser welding between the wave washers.

An end member is further laminated and attached to the bending part. At the time of the attachment, it is not possible to adopt laser welding because a laser light cannot be irradiated from a laminating direction to between the end of the bending part and the end member.

Such laser welding enables a strong bonding with a simple process compared to bonding by soldering or the like. A coil spring or bellows may also be used as the bending part, so it has been desired to join the end member to these bending parts by laser welding.

RELATED ART DOCUMENTS

Patent Documents

Patent Document 1: International Publication No. WO2019/073860

SUMMARY OF INVENTION

Problem to be Solved by Invention

The problem to be solved lies in that it has not been possible to attach an end member to an end of a bending part in an axial direction by laser welding.

Means for Solving Problem

The present invention provides a bending structure including a bending part, an end member, a thin part, an exposing part, and a welding part. The bending part is elastically bendable with respect to an axial direction. The end member is attached to an end of the bending part in the axial direction. The thin part is formed at the end member and is thinner than the end member in the axial direction. The exposing part is provided at the end member and exposes the thin part in the axial direction in a manner capable of being irradiated with a laser light of laser welding. The welding part is formed at the thin part by the laser welding and joins the thin part to the bending part.

Further, the present invention provides a method for producing a bending structure, which attaches an end member by laser welding to an end in an axial direction of a bending part that is elastically bendable with respect to the axial direction to produce a bending structure. The method for producing a bending structure includes steps below. A thin part, which is thinner than the end member in the axial direction, is formed at the end member, and the thin part is exposed by an exposing part provided at the end member in a manner capable of being irradiated with a laser light of the laser welding. The end member is positioned with respect to the bending part to cause the thin part to be located on a bending part side. The thin part is joined to the bending part by the laser welding via the exposing part.

Effect of Invention

According to the bending structure of the present invention, it is possible to realize a structure in which an end member is attached by laser welding to an end of a bending part in an axial direction.

According to the method for producing a bending structure of the present invention, it is possible to attach an end member by laser welding to an end of a bending part in an axial direction to produce a bending structure.

DESCRIPTION OF EMBODIMENTS

Figure 1:
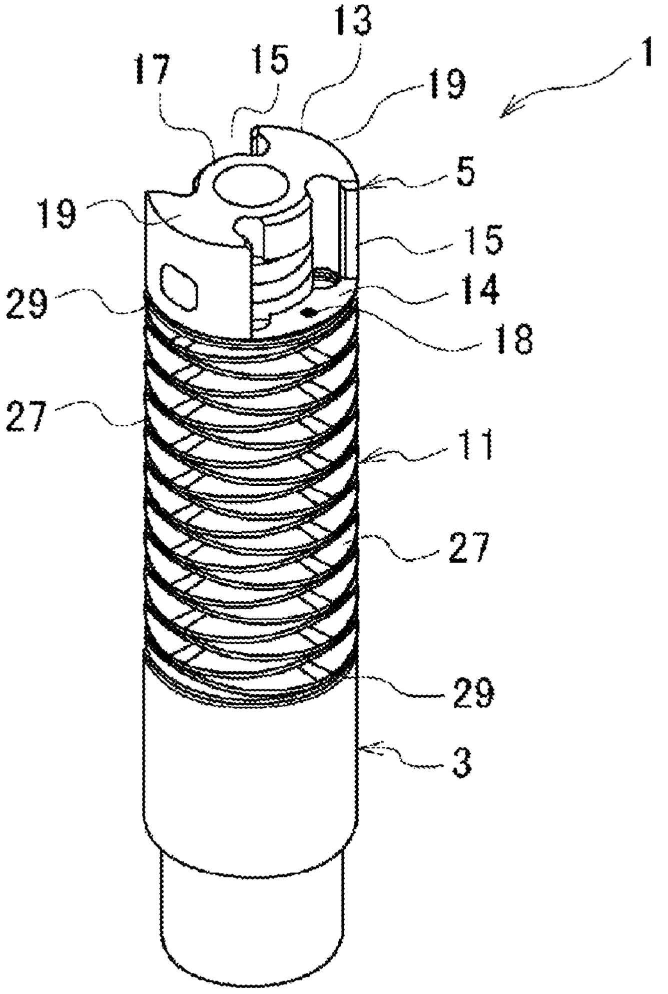
FIG. 1 is a perspective view showing a bending structure according to Embodiment 1 of the present invention.

An objective of enabling attachment of an end member to an end of a bending part in an axial direction by laser welding has been achieved by providing a thin part capable of being welded with the bending part by irradiating a laser light onto the end member.

That is, a bending structure (1) includes a bending part (11, 35, 37), an end member (3, 5), a thin part (14), an exposing part (15), and a welding part (18). The bending part (11, 35, 37) is a member that is elastically bendable with respect to an axial direction. The end member (3, 5) is attached at an end of the bending part (11, 35, 37) in the axial direction. The thin part (14) formed at the end member (3, 5) and is thinner than the end member (3, 5) in the axial direction. The exposing part (15) is provided at the end member (3, 5) and exposes the thin part (14) in the axial direction in a manner capable of being irradiated with a laser light of laser welding. The welding part (18) is formed at the thin part (14) by laser welding and joins the thin part (14) to the bending part (11, 35, 37).

The exposing part (15) may be configured as a notch that opens the thin part (14) to outside the end member (3, 5).

The thin part (14) may be composed of a plate material that is laminated and joined to the end member (3, 5).

The bending part (11, 35, 37) may include a plurality of wave washers (27) that are laminated in the axial direction and of which a laminated state is maintained by laser welding. The thin part (14) may be configured as a wave washer (27) that is laminated on the end member (3, 5) and joined by laser welding. In that case, the thin part (14) is joined by the welding part (18) to the wave washer (27) located at an end of the plurality of wave washers (27) to constitute an end of the bending part (11, 35, 37).

Further, the bending part (11, 35, 37) may include a flat washer (29) that is laminated in the axial direction on the end of the plurality of wave washers (27) and of which a laminated state is maintained by laser welding. In that case, the thin part (14) is joined by laser welding to the flat washer (29) located at the end of the plurality of wave washers (27).

A method for producing such a bending structure (1) includes forming a thin part (14), which is thinner than an end member (3, 5) in an axial direction, at the end member (3, 5), and exposing the thin part (14) by an exposing part (15) of the end member (3, 5) in a manner capable of being irradiated with a laser light of laser welding. Next, the end member (3, 5) is positioned with respect to a bending part (11, 35, 37), and the thin part (14) is caused to be located on a bending part (11, 35, 37) side. Then, the thin part (14) is laser welded to the bending part (11, 35, 37) by laser irradiation via the exposing part (15).

In the case where the bending part (11, 35, 37) is composed of a plurality of wave washers (27), the bending part (11, 35, 37) is formed by laminating the plurality of wave washers (27) in the axial direction and maintaining the laminated state by laser welding. Before or after formation of the bending part (11, 35, 37), the thin part (14) is formed by laminating the wave washer (27) on the end member (3, 5) and joining by laser welding. Next, the thin part (14) is joined by laser welding to the wave washer (27) located at an end of the plurality of wave washers (27) and constitutes an end of the bending part (11, 35, 37).

In the case where the bending part (11, 35, 37) includes a flat washer (29) laminated on the end of the plurality of wave washers (27), the thin part (14) is joined by laser welding to the flat washer (29) located at the end of the plurality of wave washers (27).

Embodiment 1

[Configuration of Bending Structure]

FIG. 1 is a perspective view showing a bending structure according to Embodiment 1 of the present invention.

Figure 2:
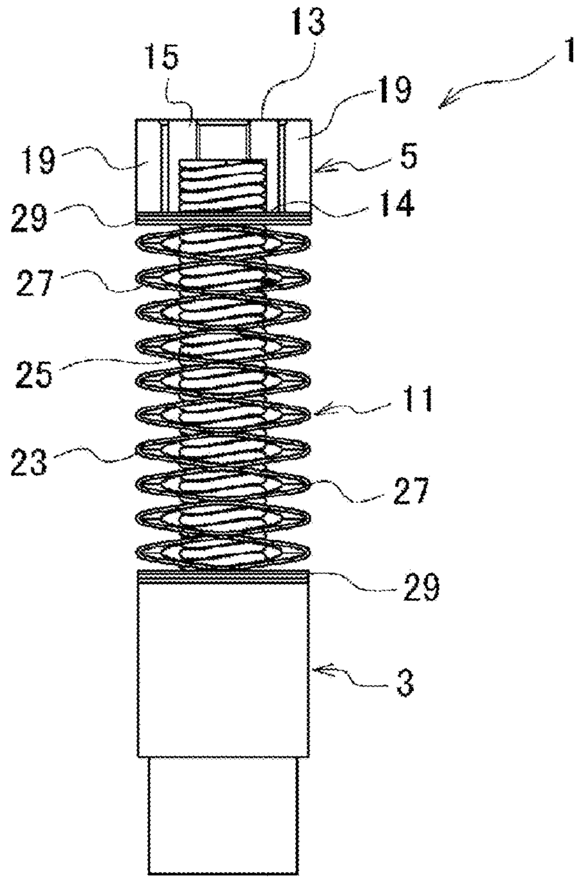
FIG. 2 is a side view of the bending structure in FIG. 1.

FIG. 2 is a side view of the bending structure in FIG. 1.

Figure 3:
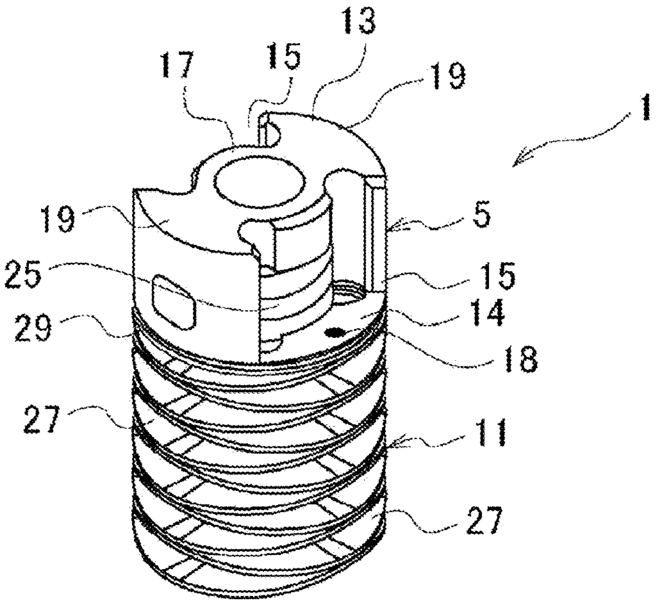
FIG. 3 is an enlarged view showing a main part of the bending structure in FIG. 1.

FIG. 3 is an enlarged view showing a main part of the bending structure in FIG. 1.

Figure 4:
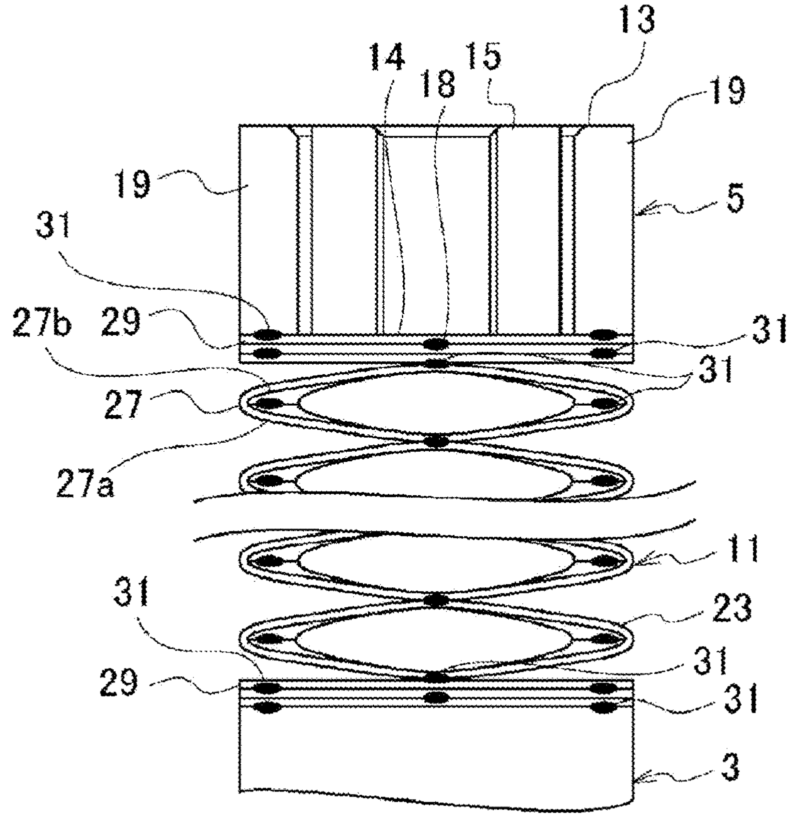
FIG. 4 is an enlarged view showing a main part of the bending structure in FIG. 2.

FIG. 4 is an enlarged view showing a main part of the bending structure in FIG. 2.

Figure 5:
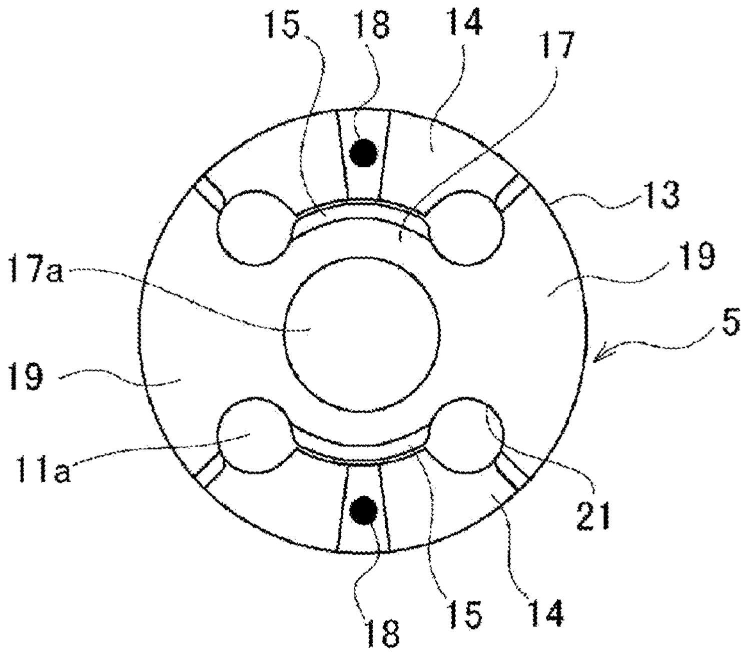
FIG. 5 is a plan view of the bending structure in FIG. 1.

FIG. 5 is a plan view of the bending structure in FIG. 1.

Figure 6:
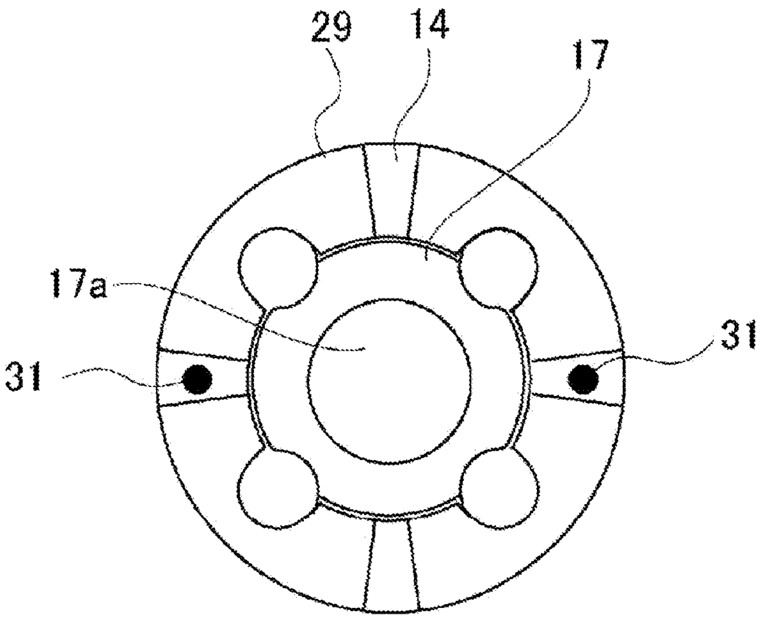
FIG. 6 is a bottom view showing a welding part between a movable part and a flat washer of the bending structure in FIG. 1.

FIG. 6 is a bottom view showing a welding part between a movable part and a flat washer of the bending structure in FIG. 1.

The bending structure 1 is applicable to a joint function part of various machines for medical and industrial use, such as a manipulator, a robot, and an actuator. The joint function part is an apparatus, a mechanism, or a device having a function as a joint that bends and extends.

The bending structure 1 of this embodiment includes a base part 3, a movable part 5, and a bending part 11.

The base part 3 is composed of a columnar body (e.g., cylindrical body) formed of metal or resin. The base part 3 is attached to an end of a shaft of a manipulator. The base part 3 is not limited to a columnar body but may be appropriately shaped according to the machine to which the bending structure 1 is applied.

The movable part 5 is supported by the bending part 11 at the base part 3 in a manner capable of being displaced with respect to an axial direction. An end effector or the like according to the machine to which the bending structure 1 is applied may be attached to the movable part 5. The "axial direction" refers to a direction along an axis of the bending structure 1 and also includes directions slightly inclined with respect to the axis.

Such a movable part 5 constitutes an end member attached to an end of the bending part 11 in the axial direction and includes a main body 13, a thin part 14, a notch 15 serving as an exposing part, and a welding part 18.

The main body 13 is formed of metal or resin into a columnar body as a whole. Similar to the base part 3, the main body 13 is appropriately shaped according to the machine to which the bending structure 1 is applied and is not necessarily limited to a columnar body made of metal or resin.

The main body 13 of this embodiment has a shape in which parts in a circumferential direction opposed in a radial direction are removed from a cylindrical body due to the notch 15. Accordingly, the main body 13 has a configuration in which fan-shaped lateral parts 19 opposed in the radial direction are integrally provided with respect to a center part 17 in a tubular shape. At the lateral part 19, the movable part 5 is joined to a flat washer 29 (hereinafter referred to as an end flat washer 29) that constitutes an end (to be described later) of the bending part 11. The "joining" in this embodiment is performed with a welding part 31 according to laser welding. The welding part 31 is formed at multiple positions in the circumferential direction of the end flat washer 29. The joining between the end flat washer 29 and the movable part 5 may also be performed by other methods such as adhesion.

An arc-shaped recess 21 in a plan view is provided between the center part 17 and the lateral part 19 of the movable part 5. The recess 21 communicates with an insertion hole 11*a* (to be described later) of the bending part 11 in the axial direction. A communication hole 17*a* extending in the axial direction is provided at the center part 17.

The communication hole 17*a* communicates with an inner circumference of an inner member 25 (to be described later) of the bending part 11 in the axial direction.

The thin part 14 is formed at the movable part 5 and is thinner than the movable part 5 in the axial direction. The thin part 14 of this embodiment is composed of a part of the end flat washer 29 in the circumferential direction exposed by the notch 15. The end flat washer 29 is an annular member that overlaps with the main body 13 of the movable part 5 in the axial direction. Details of the end flat washer 29 (flat washer 29) will be described later.

The thin part 14 may be configured as a simple plate material or a plate material partially attached only at a position corresponding to the notch 15, as long as it is a plate material laminated and joined to the movable part 5. Further, the thin part 14 may also be formed by thinning a part of the movable part 5. Further, instead of the flat washer 29, the thin part 14 may also be composed of a wave washer 27.

A plane shape of the thin part 14 is set according to the shape of the notch 15 and is an arc shape in this embodiment. However, the plane shape of the thin part 14 is not particularly limited as long as it can be irradiated with a laser light of laser welding.

The notch 15 is provided at the movable part 5 to expose the thin part 14 in the axial direction in a manner capable of being irradiated with a laser light of laser welding. The "exposure" in the axial direction means exposing the thin part 14 to outside in the axial direction such that laser welding from the axial direction becomes possible.

The "laser welding" from the axial direction refers to welding performed by irradiating a laser light onto a surface of the thin part 14 in the axial direction, and the laser light does not necessarily travel in the axial direction. Thus, the exposure in the axial direction includes not only exposing the thin part 14 to outside in a manner capable of being irradiated with a laser light along the axial direction, but also exposing the thin part 14 to outside in a range in which the laser light can be irradiated onto the surface of the thin part 14 from a direction inclined with respect to the axial direction.

The notch 15 of this embodiment is formed along the axial direction of the main body 13, and opens a part in the circumferential direction of the end flat washer 29, which is overlapped by the main body 13, to outside the movable part 5 as the thin part 14, in a manner capable of being irradiated with a laser light along the axial direction.

Figure 7:
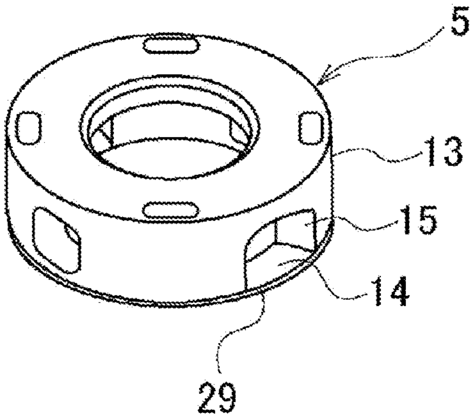
FIG. 7 is a perspective view showing a movable part of a bending structure according to a modification example.

FIG. 7 shows a modification example of the notch 15. In the modification example in FIG. 7, the notch 15 is provided from a lateral side of the main body 13 of the movable part 5. This notch 15 opens the thin part 14 to outside in the axial direction in a range in which a laser light can be irradiated onto the surface of the thin part 14 from a direction inclined with respect to the axial direction.

In this embodiment, although the notch 15 is provided as an exposing part, the exposing part is not limited to the notch 15 as long as it exposes the thin part 14 in a manner capable of being irradiated with a laser light of laser welding. For example, the exposing part may be configured as a hole or a transmissive material capable of transmitting a laser light.

In the case where the exposing part is configured as a hole, it is formed at the movable part 5 along an irradiation direction of the laser light. In the case where the welding part 18 (to be described later) is formed only at one welding spot, it is possible to configure the exposing part as a hole in any shape such as a cone or a cylinder according to the laser light. In the case where the exposing part is configured as a transmissive material, the movable part 5 itself may be formed of a transmissive material, and a portion corresponding to the thin part 14 may be taken as the exposing part.

A plane shape of the notch 15 in this embodiment is an arc shape according to the shape of a part in the circumferential direction of the end flat washer 29 serving as the thin part 14. However, the plane shape of the notch 15 may be set to any shape in a range that exposes the thin part 14 in a manner capable of being irradiated with a laser light of laser welding.

Figure 8:
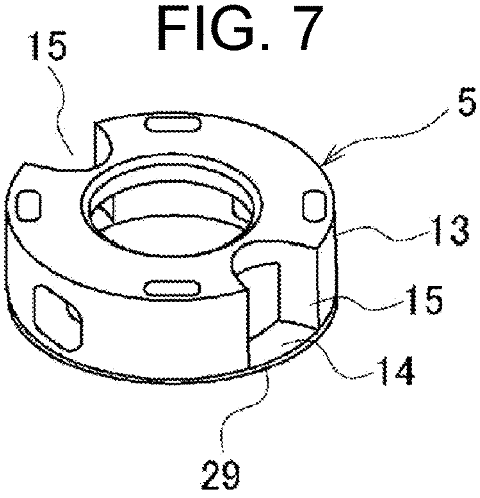
FIG. 8 is a perspective view showing a movable part of a bending structure according to another modification example.

FIG. 8 shows another modification example of the notch 15. In the modification example in FIG. 8, the plane shape of the notch 15 is changed, and a dimension in the circumferential direction is reduced.

The welding part 18 is formed at the thin part 14 by laser welding and joins the thin part 14 to the bending part 11. The size and shape of the welding part 18 may be set in any manner, and may be set, for example, to an appropriate shape such as a V-shape or a straight line shape in a size located approximately at an intermediate part in the radial direction and the circumferential direction of the thin part 14.

The bending part 11 is composed of an outer member 23 and an inner member 25. The inner member 25 may also be omitted.

The outer member 23 includes a plurality of wave washers 27 and a plurality of flat washers 29. The outer member 23 may also adopt other forms such as a double coil structure, a coil spring, or bellows (to be described later).

The plurality of wave washers 27 are laminated in the axial direction and the laminated state is maintained by laser welding. With elastic deformation of the wave washer 27, elastic bending becomes possible.

Each wave washer 27 is a plate material formed of metal or the like into a closed or opened ring shape. The wave washer 27 in this embodiment is a ring-shaped plate material made of stainless steel and has a constant radial width between inner and outer circumferences and a constant plate thickness.

An abutting portion of the wave washer 27 with respect to an adjacent wave washer 27 is joined by the welding part 31 according to laser welding.

In this embodiment, the wave washer 27 includes a plurality of peaks 27*a* in the circumferential direction and includes valleys 27*b* between the adjacent peaks 27*a*. Between the wave washers 27 adjacent in the axial direction, the peak 27*a* of one wave washer 27 abuts against the valley 27*b* of the other wave washer. The peak 27*a* and the valley 27*b* adjacent to each other are joined by the welding part 31 according to laser welding.

The peak 27*a* and the valley 27*b* may not necessarily abut against each other and, for example, may offset from each other slightly in the circumferential direction and abut against an inclined part 27*c*. Further, the shape and material of the wave washer 27 may be appropriately changed according to the required properties.

The plurality of flat washers 29 are respectively laminated in the axial direction at two ends of the plurality of wave washers 27 and the laminated state is maintained by laser welding. In this embodiment, three flat washers 29 are laminated.

Each flat washer 29 is a plate material formed of metal or the like into a closed or opened ring shape. The flat washer 29 has the same inner and outer diameters and plate thickness as the wave washer 27 made of the same material, and is formed to be flat. Thus, when the outer member 23 bends, the flat washers 29 deform along with the wave washers 27 to separate from each other, but the deformation amount of the flat washer 29 is smaller than that of the wave washer 27. The flat washer 29 may also be formed using a material different from that of the wave washer 27.

The joining between the flat washer 29 and the wave washer 27 is performed by joining abutting portions between the flat washer 29 and the wave washer 27 by the welding part 31 according to laser welding.

The joining between the flat washers 29 and the joining between the flat washer 29 and the base part 3 and the movable part 5 are performed with the welding part 31 at positions sequentially displaced in the circumferential direction, in a manner following the joining between the wave washers 27.

The flat washers 29 may also be provided only at one of one end and the other end of the plurality of wave washers 27. Further, the flat washers 29 may also be omitted.

An insertion hole 11*a* penetrating in the axial direction is formed at the outer member 23 of such a configuration. A drive wire (not shown) is inserted into the insertion hole 11*a*, and the outer member 23 of the bending part 11 also functions as a guide for the drive wire.

One end of the drive wire is connected to the movable part 5, and the other end of the drive wire is positioned on the base part 3 side to enable pulling. With this pulling, bending of the bending part 11 is performed.

The inner member 25 is composed of a coil spring such as a close-contact spring or a double coil structure spring made of metal or resin. The inner member 25 may have various forms and may be composed of a tube body having flexibility.

Such an inner member 25 is configured to be bendable and extendable with respect to the axial direction as a whole and suppress compression in the axial direction. Further, in the case where the inner member 25 has a double coil structure, the length of the axis is almost constant before, during, and after bending. Thus, it is possible to keep the path length of a member inserted through the inner member 25 constant.

[Method for Producing Bending Structure]

FIG. 9 to FIG. 12 are perspective views showing a method for producing the bending structure 1.

As shown in FIG. 9 to FIG. 12, the method for producing the bending structure 1 of this embodiment includes attaching the movable part 5 to an end of the bending part 11 in an axial direction by laser welding. The laser welding may follow an appropriate method such as carbon dioxide laser, yttrium aluminum garnet (YAG) laser, and fiber laser.

In such a production method, after formation of the bending part 11 and formation of the thin part 14 on the movable part 5, joining of the thin part 14 of the movable part 5 with respect to the bending part 11 is performed by laser welding. The sequence of formation of the bending part 11 and formation of the thin part 14 with respect to the movable part 5 may be reversed.

Figure 9:
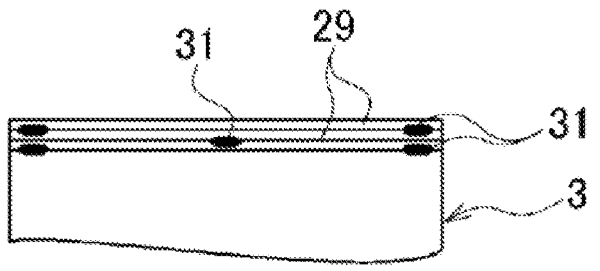
FIG. 9 is a side view showing a method for producing a bending structure according to Embodiment 1 of the present invention.

In the formation of the bending part 11, as shown in FIG. 9, first, a plurality of flat washers 29 of the outer member 23 are laminated in the axial direction on the base part 3, and the laminated state is maintained by laser welding from the axial direction.

Each time the flat washer 29 is laminated in the axial direction, laser welding is performed by irradiating a laser light from above onto an abutting portion of the flat washer 29 with respect to the base part 3 and onto abutting portions between the flat washers 29. Accordingly, welding parts 31 are formed to join the abutting portions between the base part 3 and the flat washer 29 and the abutting portions between the flat washers 29.

Although abutment is present between the base part 3 and the flat washer 29 and between the flat washers 29 over the entire circumferential direction, the portion irradiated with the laser light is a part in the circumferential direction of the abutting portions. The portions irradiated with the laser light are displaced in the circumferential direction, in a manner following the abutting portions between the wave washers 27.

Figure 10:
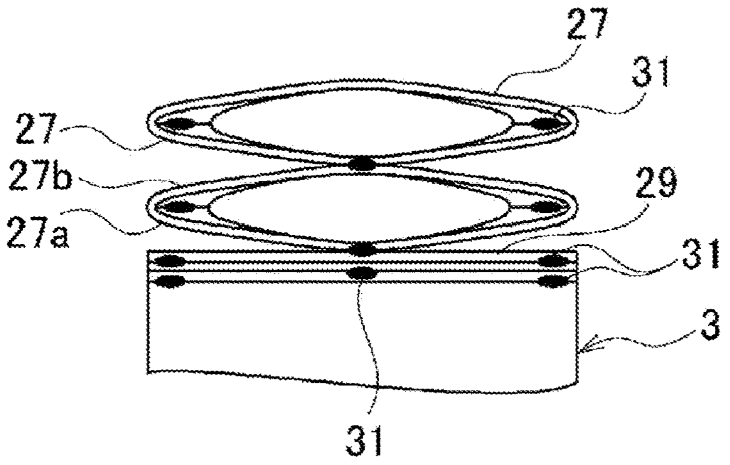
FIG. 10 is a side view showing the method for producing a bending structure according to Embodiment 1 of the present invention.

Next, as shown in FIG. 10, a plurality of wave washers 27 are laminated in the axial direction on the plurality of laminated flat washers 29, and the laminated state is maintained by laser welding from the axial direction.

Each time the wave washer 27 is laminated in the axial direction, laser welding is performed by irradiating a laser light from above onto abutting portions between the flat washer 29 and the wave washer 27 and onto abutting portions between the wave washers 27. Accordingly, welding parts 31 are formed to join between the flat washer 29 and the wave washer 27 and between the wave washers 27.

The abutting portion between the flat washer 29 and the wave washer 27 is a portion at which the valley 27*b* of the wave washer 27 abuts against the flat washer 29, and the abutting portion between the wave washers 27 is a portion at which the peak 27*a* and the valley 27*b* of adjacent wave washer 27 abut against each other.

Figure 11:
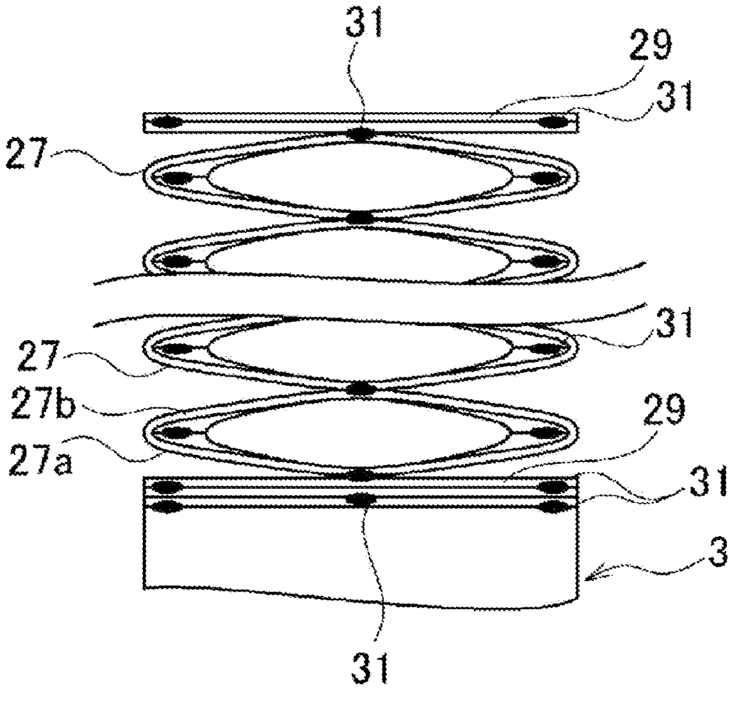
FIG. 11 is a side view showing the method for producing a bending structure according to Embodiment 1 of the present invention.

Next, as shown in FIG. 11, flat washers 29 are laminated in the axial direction on the plurality of laminated wave washers 27, and the laminated state is maintained by laser welding from the axial direction. The flat washers 29 to be laminated are two flat washers 29 excluding the end flat washer 29 constituting the thin part 14.

Thus, the wave washers 27 and the flat washers 29 excluding the end flat washer 29 are laminated, and the laminated state is maintained to form an outer member 23 of the bending part 11. After formation of the outer member 23, an inner member 25 is arranged inside the outer member 23.

The inner member 25 may also be arranged before formation of the outer member 23, and the flat washers 29 and the wave washers 27 may also be laminated by inserting the inner member 25.

Figure 12:
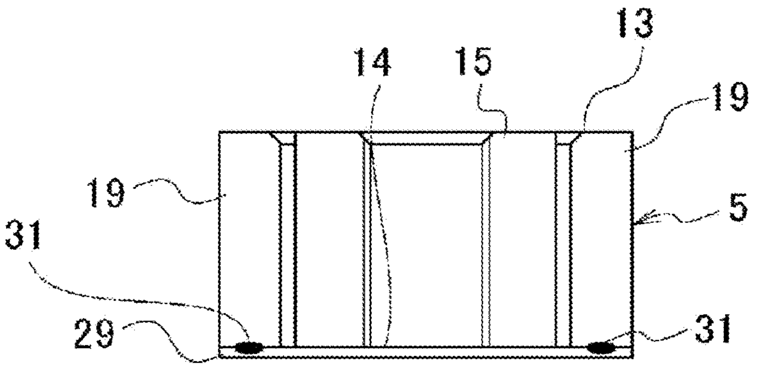
FIG. 12 is a side view showing the method for producing a bending structure according to Embodiment 1 of the present invention.

In the formation of the thin part 14 with respect to the movable part 5, as shown in FIG. 12, a thin part 14 thinner than the movable part 5 in the axial direction is formed at the movable part 5, and is exposed by a notch 15 provided at the movable part 5 in a manner capable of being irradiated with a laser light of laser welding.

In this embodiment, an end flat washer 29 is laminated in the axial direction on the movable part 5 and is joined by laser welding to form the thin part 14.

The lamination of the end flat washer 29 is performed by overlapping the end flat washer 29 with respect to a bottom surface of the movable part 5. The laser welding is performed by irradiating a laser light from the axial direction onto an abutting portion of the end flat washer 29 with respect to the movable part 5. Accordingly, a welding part 31 is formed to join the end flat washer 29 to the movable part 5.

A part in the circumferential direction of the end flat washer 29 joined to the movable part 5 faces the notch 15, and its surface is exposed to outside via the notch 15. Accordingly, the thin part 14 is formed.

In this state in which the bending part 11 and the thin part 14 with respect to the movable part 5 have been formed, the movable part 5 is attached to the bending part 11.

In the attachment of the movable part 5 to the bending part 11, as shown in FIG. 4, the thin part 14 is joined to the bending part 11 by laser welding via the notch 15.

In the attachment, first, the movable part 5 is positioned with respect to the bending part 11. By this positioning, the end wave washer 27 is set to the bending part 11 side and is caused to be located between the bending part 11 and the movable part 5, and the position in the circumferential direction of the thin part 14 is aligned with the peak 27*a* of the wave washer 27 serving as a joining target.

Accordingly, the thin part 14 abuts against the peak 27*a* of the wave washer 27 serving as the joining target. Laser welding is performed by irradiating a laser light via the notch 15 onto the abutting portion of the thin part 14 with respect to the wave washer 27. Accordingly, a welding part 18 is formed at the thin part 14 to join the thin part 14 with the wave washer 27 located at the end.

With such joining, the movable part 5 is joined to the bending part 11, and the end wave washer 27 joined to the movable part 5 constitutes an end of the bending part 11 (outer member 23).

Thus, the steps from formation of the bending part 11 to joining of the movable part 5 with respect to the bending part 11 can be easily performed by lamination and laser welding of the flat washers 29, the wave washers 27, and the movable part 5 from the axial direction.

Effect of Embodiment 1

As described above, a bending structure 1 of this embodiment includes: a bending part 11 that is elastically bendable with respect to an axial direction; a movable part 5 that is attached to an end of the bending part 11 in the axial direction; a thin part 14 that is formed at the movable part 5 and is thinner than the movable part 5 in the axial direction; a notch 15 that is provided at the movable part 5 and exposes the thin part 14 in the axial direction in a manner capable of being irradiated with a laser light of laser welding; and a welding part 18 that is formed at the thin part 14 by laser welding and joins the thin part 14 to the bending part 11.

Thus, the bending structure 1 of this embodiment can realize a structure in which the movable part 5 is attached by laser welding to the end of the bending part 11 in the axial direction.

In such a method for producing the bending structure 1, the thin part 14 thinner than the movable part 5 in the axial direction is formed at the movable part 5, the thin part 14 is exposed by the notch 15 provided at the movable part 5 in a manner capable of being irradiated with a laser light of laser welding, the movable part 5 is positioned with respect to the bending part 11 to cause the thin part 14 to be located on the bending part 11 side, and the thin part 14 is joined to the bending part 11 by laser welding via the notch 15.

Thus, it is possible to attach the movable part 5 to the end of the bending part 11 in the axial direction by laser welding to produce the bending structure 1 easily and reliably.

Further, the notch 15 opens the thin part 14 to outside the movable part 5, and the laser light can be easily irradiated onto the thin part 14.

Further, since the thin part 14 is composed of the flat washer 29 which is the plate material laminated and joined to the movable part 5, the thin part 14 can be easily formed.

Particularly, the bending part 11 includes the plurality of wave washers 27 and the flat washers 29 at the end thereof that are laminated in the axial direction, and the laminated state is maintained by laser welding. The thin part 14 is formed using the flat washer 29 that constitutes the end of the bending part 11.

Accordingly, the thin part 14 can be easily formed without using a dedicated member. Moreover, the steps from formation of the bending part 11 to attachment of the movable part 5 with respect to the bending part 11 can be easily performed by lamination and laser welding of the flat washers 29, the wave washers 27, and the movable part 5 from the axial direction.

Embodiment 2

Figure 13:
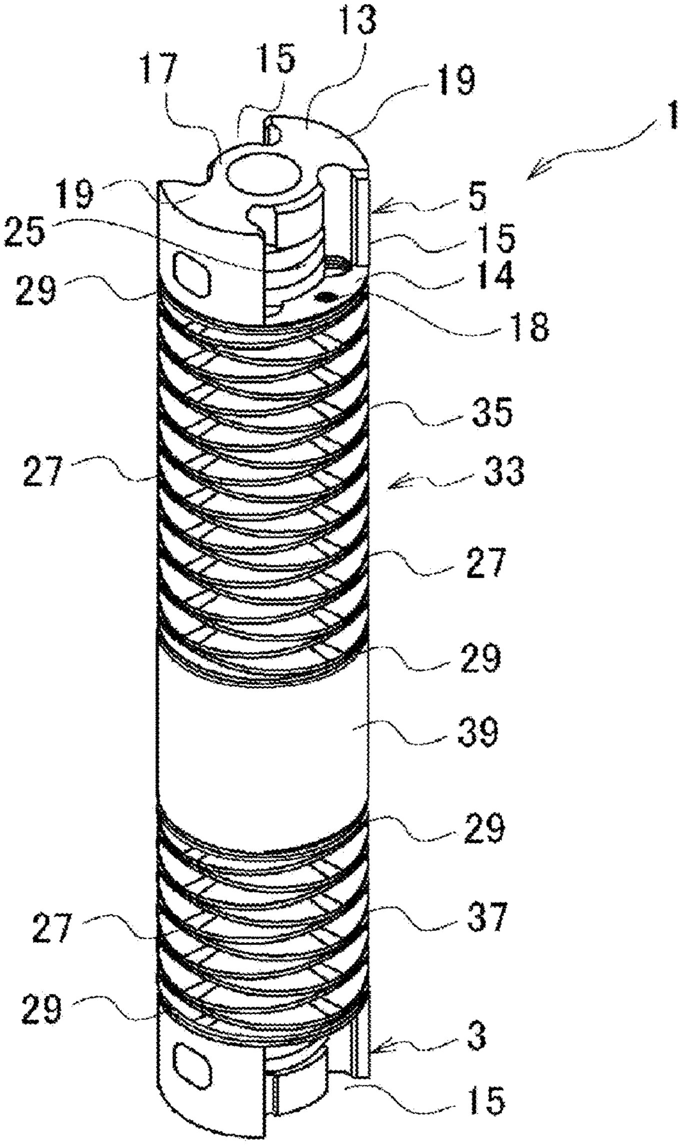
FIG. 13 is a perspective view showing a bending structure according to Embodiment 2 of the present invention.
Figure 14:
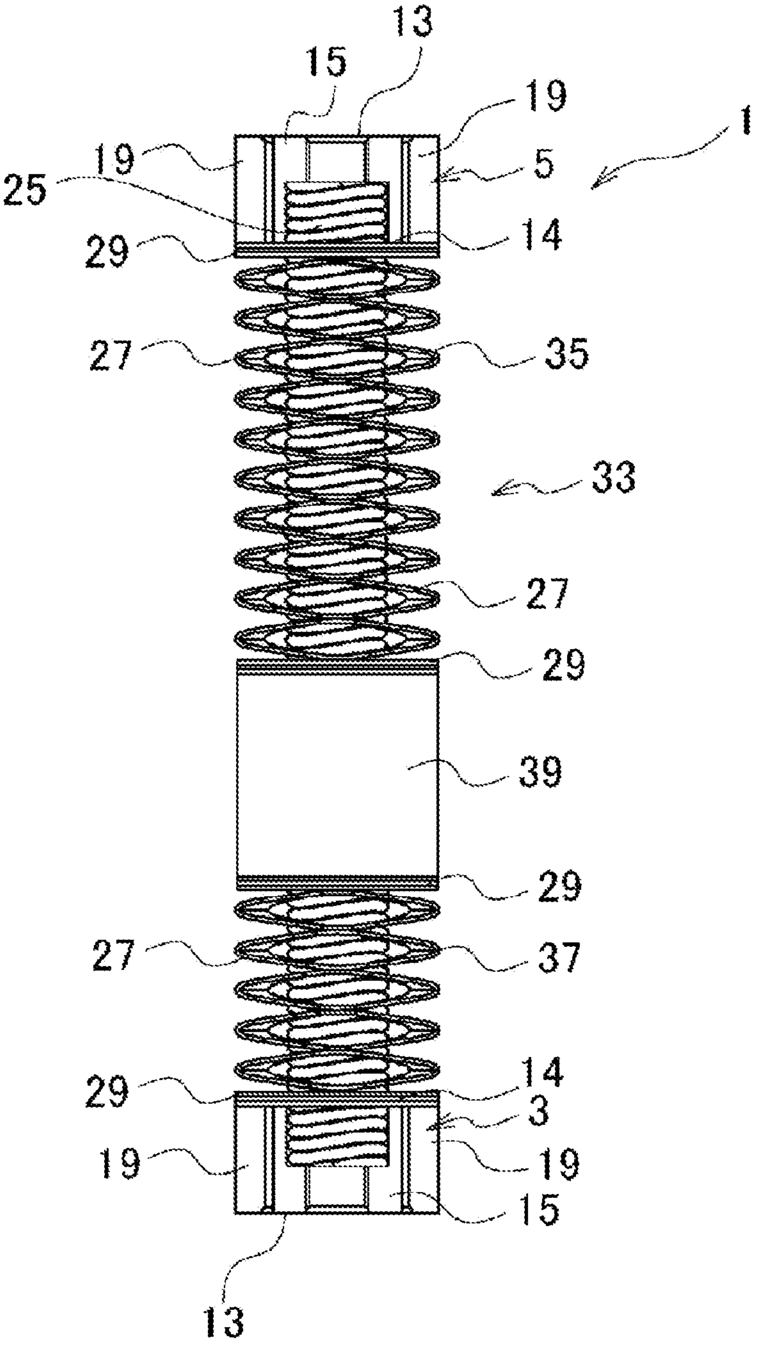
FIG. 14 is a side view of the bending structure in FIG. 13.

FIG. 13 is a perspective view showing a bending structure according to Embodiment 2 of the present invention. FIG. 14 is a side view of the bending structure in FIG. 13. In Embodiment 2, components corresponding to those in Embodiment 1 will be labeled with the same reference signs, and repeated descriptions thereof will be omitted.

The bending structure 1 of this embodiment is configured as a multi-joint structure. That is, the bending structure 1 includes a multi-joint part 33 between the base part 3 and the movable part 5.

The multi-joint part 33 is configured by attaching a first bending part 35 and a second bending part 37 to two sides in the axial direction of an intermediate part 39 in a cylindrical shape.

The first bending part 35 and the second bending part 37 have the same configuration as the bending part 11 in Embodiment 1 except for the length in the axial direction. The movable part 5 and the base part 3 are respectively attached to ends of the first bending part 35 and the second bending part 37. The base part 3 of this embodiment has the same configuration as the movable part 5 and constitutes an end member in the same manner as the movable part 5.

At the time of producing the bending structure 1, a plurality of flat washers 29 and a plurality of wave washers 27 are laminated on two sides in the axial direction of the intermediate part 39 to form the outer members 23 of the first bending part 35 and the second bending part 37, and the movable part 5 and the base part 3 are respectively attached to the ends of the outer members 23 by laser welding.

The lamination of the flat washers 29 and the plurality of wave washers 27 and the attachment of the movable part 5 and the base part 3 by laser welding are identical to those in Embodiment 1.

The base part 3 may also be configured in the same manner as in Embodiment 1, and the intermediate part 39 may also be configured in the same manner as the movable part 5 in Embodiment 1.

In such Embodiment 2 as well, it is possible to achieve actions and effects similar to those in Embodiment 1.

Embodiment 3

Figure 15:
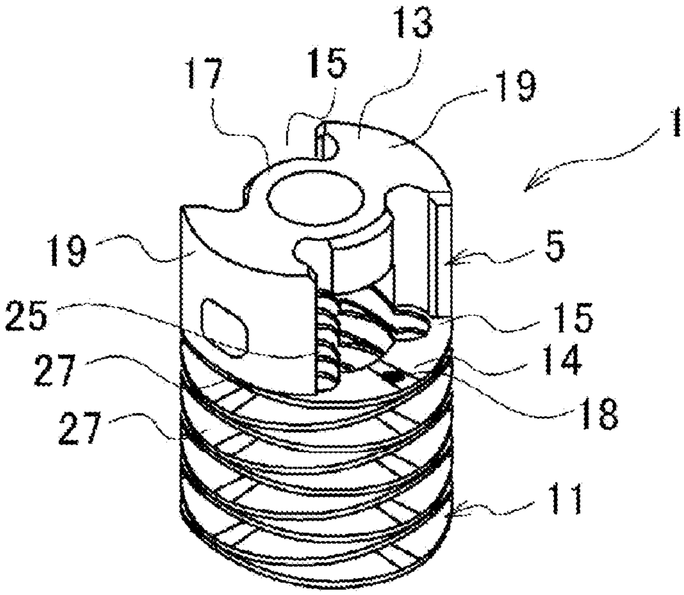
FIG. 15 is a perspective view showing a main part of a bending structure according to Embodiment 3 of the present invention.

FIG. 15 is a perspective view showing a main part of a bending structure according to Embodiment 3 of the present invention. In Embodiment 3, components corresponding to those in Embodiment 1 will be labeled with the same reference signs, and repeated descriptions thereof will be omitted.

In the bending structure 1 in this embodiment, the flat washers 29 are omitted from the outer member 23. Accordingly, the thin part 14 is composed of the wave washer 27 joined to the movable part 5. The rest is the same as in Embodiment 1. The thin part 14 may also be composed of the flat washer joined to the movable part 5 in the same manner as in Embodiment 1. Further, the flat washers 29 on the base part 3 side may also be omitted.

In such Embodiment 3 as well, it is possible to achieve actions and effects similar to those in Embodiment 1.

The invention claimed is:

1. A bending structure comprising:

a bending part that is elastically bendable with respect to an axial direction;

an end member that is attached to an end of the bending part in the axial direction;

a thin part that is formed at the end member and is thinner than the end member in the axial direction;

an exposing part that is provided at the end member and exposes the thin part in the axial direction in a manner capable of being irradiated with a laser light of laser welding; and a welding part that is formed at the thin part by the laser welding and joins the thin part to the bending part, wherein the thin part is composed of a plate material that is laminated and joined to the end member.

2. The bending structure according to claim 1, wherein the exposing part is a notch that opens the thin part to outside the end member.

3. The bending structure according to claim 1, wherein the bending part comprises a plurality of wave washers that are laminated in the axial direction and of which a laminated state is maintained by the laser welding, and the thin part is composed of an end wave washer that is laminated on the end member and joined by the laser welding, and the thin part is joined by the welding part to the end wave washer located at an end of the plurality of wave washers to constitute an end of the bending part with the end wave washer forming the thin part.

4. The bending structure according to claim 3, wherein the bending part comprises a flat washer that is laminated in the axial direction on the end of the plurality of wave washers and of which a laminated state is maintained by the laser welding, and the thin part is joined by the laser welding to the flat washer located at the end of the plurality of wave washers.

5. A method for producing a bending structure, which attaches an end member by laser welding to an end in an axial direction of a bending part that is elastically bendable with respect to the axial direction to produce a bending structure, the method for producing a bending structure comprising:

forming a thin part, which is thinner than the end member in the axial direction, at the end member, and exposing the thin part by an exposing part provided at the end member in a manner capable of being irradiated with a laser light of the laser welding;

positioning the end member with respect to the bending part to cause the thin part to be located on a bending part side; and joining the thin part to the bending part by the laser welding via the exposing part, wherein the thin part is formed by laminating and joining a plate material to the end member.

6. The method for producing a bending structure according to claim 5, wherein the exposing part is a notch or a hole that opens the thin part to outside the-end member.

7. The method for producing a bending structure according to claim 5, wherein the bending part is formed by laminating a plurality of wave washers in the axial direction and maintaining a laminated state by the laser welding, the thin part is formed by laminating an end wave washer on the end member and joining by the laser welding, and the thin part is joined by the laser welding to the end wave washer located at an end of the plurality of wave washers, and an end of the bending part is constituted by the end wave washer forming the thin part.

8. The method for producing a bending structure according to claim 7, wherein the bending part comprises a flat washer that is laminated in the axial direction on the end of the plurality of wave washers and of which a laminated state is maintained by the laser welding, and the thin part is joined by the laser welding to the flat washer located at the end of the plurality of wave washers.

* * * * *